US012230100B2

(12) United States Patent
Bradley et al.

(10) Patent No.: US 12,230,100 B2
(45) Date of Patent: Feb. 18, 2025

(54) SYSTEM AND PLATFORM FOR DEIDENTIFIED AND DECENTRALIZED SOCIAL GAMING VIA THE BLOCKCHAIN

(71) Applicant: Data Vault Holdings, Inc., New York, NY (US)

(72) Inventors: Nathaniel T. Bradley, Tucson, AZ (US); Joshua S. Paugh, Tucson, AZ (US); Eric Klayman, Staten Island, NY (US); Christian Talvy, Staten Island, NY (US); Alexander Antonopoulos, Staten Island, NY (US); Joseph G. Grigoli, Staten Island, NY (US)

(73) Assignee: DATA VAULT HOLDINGS, INC., New York, NY (US)

( * ) Notice: Subject to any disclaimer, the term of this patent is extended or adjusted under 35 U.S.C. 154(b) by 0 days.

(21) Appl. No.: 17/403,478

(22) Filed: Aug. 16, 2021

(65) Prior Publication Data
US 2023/0052413 A1 Feb. 16, 2023

(51) Int. Cl.
| A63F 9/24 | (2006.01) |
| A63F 11/00 | (2006.01) |
| G06F 13/00 | (2006.01) |
| G06F 17/00 | (2019.01) |
| G06F 21/62 | (2013.01) |
| G06Q 20/38 | (2012.01) |
| G06Q 30/0251 | (2023.01) |
| G06Q 50/34 | (2012.01) |
| G07F 17/32 | (2006.01) |

(52) U.S. Cl.
CPC ...... *G07F 17/3237* (2013.01); *G06F 21/6254* (2013.01); *G06Q 20/381* (2013.01); *G06Q 20/389* (2013.01); *G06Q 30/0269* (2013.01); *G06Q 50/34* (2013.01); *G07F 17/323* (2013.01); *G07F 17/3244* (2013.01); *G07F 17/3276* (2013.01); *G07F 17/3288* (2013.01)

(58) Field of Classification Search
CPC ... G07F 17/32; G07F 17/3201; G07F 17/3213
USPC .............................. 463/1, 20, 22, 25, 30, 39
See application file for complete search history.

(56) References Cited

U.S. PATENT DOCUMENTS

| 10,297,106 B1 | 5/2019 | Simons |
| 10,453,311 B2 | 10/2019 | Hall |

(Continued)

FOREIGN PATENT DOCUMENTS

| CN | 112424815 A | 2/2021 |
| WO | 2019089774 A1 | 5/2019 |

(Continued)

*Primary Examiner* — Adetokunbo O Torimiro
(74) *Attorney, Agent, or Firm* — Goodhue, Coleman & Owens, P.C.

(57) ABSTRACT

A system, method, device, and platform for performing a gaming utilizing blockchain. A player profile is created in response to information received from a player. Gaming information is received from the player associated with the one or more games. Selections are assigned to the player for the one or more games utilizing player profile and the gaming information. Winners and a host with each of the one or more games of the one or more games are compensated once the one or more games are completed. The player profile, the gaming information, the selections, and the winners are documented utilizing the blockchain.

20 Claims, 10 Drawing Sheets

(56) References Cited

U.S. PATENT DOCUMENTS

| | | |
|---|---|---|
| 10,593,157 B2 | 3/2020 | Simons |
| 10,614,661 B2 | 4/2020 | Simons |
| 10,825,295 B2 | 11/2020 | Simons |
| 10,832,522 B2 | 11/2020 | Simons |
| 11,030,860 B2 | 6/2021 | Ovalle |
| 2007/0102877 A1 | 5/2007 | Personius et al. |
| 2015/0080124 A1* | 3/2015 | Andersen ............ G07F 17/3288 463/31 |
| 2019/0130701 A1* | 5/2019 | Simons ................ H04L 9/0637 |
| 2019/0304259 A1 | 10/2019 | Joao |
| 2019/0392178 A1 | 12/2019 | Rice |
| 2020/0027315 A1 | 1/2020 | Cotton |
| 2020/0175818 A1 | 6/2020 | Joao |
| 2020/0294354 A1 | 9/2020 | Joao |
| 2020/0320825 A1 | 10/2020 | Simons |
| 2021/0118085 A1 | 4/2021 | Bushnell et al. |

FOREIGN PATENT DOCUMENTS

| | | |
|---|---|---|
| WO | 2019089778 A1 | 5/2019 |
| WO | 2020097595 A1 | 5/2020 |
| WO | 2021081178 A1 | 4/2021 |

* cited by examiner

SYSTEM AND PLATFORM FOR DEIDENTIFIED AND DECENTRALIZED SOCIAL GAMING VIA THE BLOCKCHAIN

BACKGROUND

I. Field of the Disclosure

The illustrative embodiments relate to gaming. More specifically, but not exclusively, the illustrative embodiments relate to a network, system, method, and platform for gaming utilizing blockchain.

II. Description of the Art

Games of chance have been growing as one of mankind's oldest social activities. For example, gambling, betting, and other games of chance are documented throughout the history of mankind. Games of chance may be utilized for entertainment, sports, fundraising, socially, and across any number of activities. Many people do not like to participate in odds or complicated wagering games or in games of chance because they feel like the game itself or the host may have rigged the game against them. Many individuals are less likely to participate due to a lack of transparency or participation with groups or individuals that they do not trust. As a result, revenue, and the opportunity to participate in such activities becomes significantly limited based on perceived bias, actual bias, or other problems associated with the games. Many of these odds-based games or games of chance also do not implement the most recent technological advances that provide enhanced opportunities for entertainment, social interaction, broaden social circles, find likeminded fans in addition to increased transparency, among other improvements around games of chance that rely totally on the user's luck.

SUMMARY OF THE DISCLOSURE

The illustrative embodiments provide a system, method, device, and platform for performing a gaming utilizing blockchain. A player profile is created in response to information received from a player. Gaming information is received from the player associated with the one or more games. Selections are assigned to the player for the one or more games utilizing player profile and the gaming information. Winners and a host with each of the one or more games of the one or more games are compensated once the one or more games are completed. The player profile, the gaming information, the selections, and the winners are documented utilizing the blockchain.

Another embodiment provides a system or implementing one or more squares games via blockchain. A number of electronic devices executing a gaming application. The gaming application is configured to receive player information and gaming information associated with a player and the one or more squares games and communicate the gaming information associated with the one or more squares games. The system also includes a gaming platform accessible by the number of electronic devices executing the gaming application. The gaming platform creates a player profile in response to the player information received from the player, assigned selection to the player associated with an event for the one or more squares games utilizing the player profile and the gaming information, and compensates winners of the one or more squares games and a host associated with each of the one or more squares games once the event is completed.

Another embodiment provides a gaming platform. The gaming platform includes a processor for executing a set of instructions and a memory for storing the set of instructions. The set of instructions are executed to create a player profile in response to information received from a player, receive betting information from the player associated with the one or more games, assign selections to the player for the one or more games utilizing the player profile and the betting information, and compensate winners of the one or more games once completed and a host associated with each of the one or more games.

In other embodiments, participation in the one or more games are enabled in response to completing the player profile. The publicly available information in the player profile may be deidentified to protect the privacy of the player. A unique hash may be created on the blockchain associated with a game identifier for the one or more games and the player. In another embodiment, currency may be received from the player for the one or more games, the currency may be converted into cryptocurrency compatible with the one or more games, and the game rules, betting data, and smart contract may be communicated for the one or more games. The gaming information includes a wagered amount for the player. The one or more games may be squares games. The player may be assigned one or more squares that are associated with a score of an event associated with the one or more games. One or more winners may be determined based on a score of the event for a designated time period. The one or more games may be enabled to be played with one or more squares randomly assigned to the player and an order of selection the one or more squares randomly assigned to players including the player. Each of the squares of the one or more games are associated with a statistic for an event associated with one or more games. The winners of the one or more games may be paid in the cryptocurrency. Communications are enabled between the players playing the one or more games and distributing communications through the one or more games as received from the players. Transactions are implemented between two or more players of the one or more games in response to terms agreed upon by the two or more players. Advertisements may be generated to display with the one or more games based on the player profile.

In one embodiment, the one or more games are American football, basketball, baseball, soccer, volleyball, motor sports, fight sports (e.g., boxing, MMA, wrestling, etc.), golf, tennis, ice hockey, badminton, and so forth.

BRIEF DESCRIPTION OF THE DRAWINGS

Illustrated aspects of the disclosure are described in detail below with reference to the attached drawing figures, which are incorporated by reference herein, and where.

DETAILED DESCRIPTION OF THE DISCLOSURE

Figure 1:
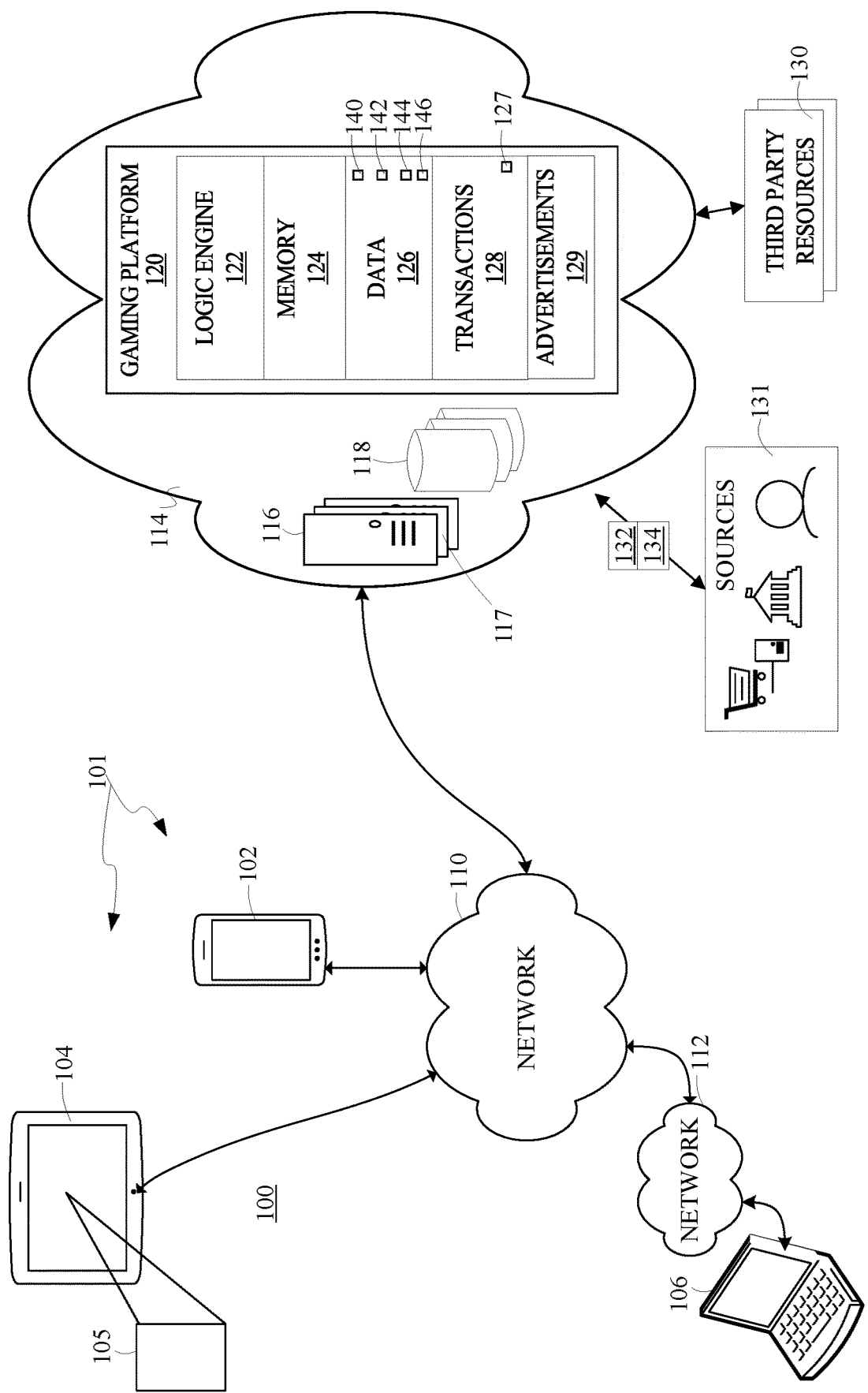
FIG. 1 is a pictorial representation of a system 100 for managing gaming in accordance with an illustrative embodiment.

The illustrative embodiments provide a network, system, method, platform, and devices for social gaming via blockchain. The illustrative embodiments utilize blockchain along with profile generation and tracking, random number/scenario generation, smart contracts, payment systems, and regulatory functions to improve social gaming. The illustrative embodiments and examples provide a method and platform to facilitate social gaming combined with an enhanced platform-based game management system, that utilizes smart contact-based rules to facilitate blockchain based payouts for social gaming-based wagering environments such as a standard American football or other sporting and non-sporting squares wagering games.

The platform and method here described may also initiate and execute player onboarding/signups, game tracking, game management, financial deposits/management, winning currency conversion, and documentation via a permanent smart contract/digital ledger that tracks every player profile, game, wager, and action performed utilizing the platform. The documentation may include immutable records with numerous safeguards to ensure fairness, credibility, transparency, and reliability during game setup, random number generation (RNG), gameplay, and game payouts. The illustrative aspects may utilize timestamps, multi-source random number generation, traceable metadata, player profiles, game profiles, and other information and data that may not be edited, deleted, or tampered with in any way. All data may be safely and securely stored to prevent identity theft, cheating, illegal activities, or so forth. Players are ensured of a fair and transparent process. In another embodiment, players may be deidentified or utilize only avatars and/or usernames to provide enhanced anonymity, safety, and security. The platform may utilize inter-game social networking features and functions to further encourage social gameplay and make the process more enjoyable for all.

The illustrative embodiments may be utilized to provide a virtual gaming environment that may be utilized for commercial (e.g., sports, politics, etc.), private, or non-profit endeavors. For example, the platform may be utilized across a broad range of player types from casinos to promote their gaming portfolio, pro and college sports, Olympics, boxing, mixed martial arts (MMA), to parent teacher associations and youth sports leagues, that want to initiate a fundraiser around this type of gaming environment. These illustrative embodiments comply with the applicable laws and regulations of each country, state, and local jurisdiction. The platform may also use best practices and industry standards to provide an open and fair process. The various exemplary aspects may implement less restrictions regarding how and when they participate due to removal of third-party financial institutions and betting houses.

The illustrative embodiments may also implement and utilize advertisements to further improve gaming profits and user engagement. For example, advertisers or sponsors may sponsor or support particular games, events, betting sessions, or actions as part of a promotion, entertainment event, marketing, campaign, charitable event, or other outreach effort. As a result, the illustrative embodiment may be utilized by various groups, ranging from sophisticated casino entities to non-profits providing a novel way to increase profits/fundraising.

The illustrative embodiments provide a system, method, platform, and network for encrypting, securing, developing, and managing gaming, betting transactions within a blockchain based gaming utilization. The data may be accessible from any number of authorized and connected devices. The illustrative embodiments allow users/consumers, consumer groups, companies, organizations, entities, governments, and other parties worldwide to develop personalized gaming strategies that allow for the creation and conversion of any game, fact scenario, or information into a monetizable luck-based game. For example, a platform may be provided for receiving a user profile, receiving, and processing currency, converting the currency to tokens/cryptocurrency, communicating game rules/information, generating randomly assigned player numbers, receiving in-game betting information, executing a game, compensating winners, paying a host, service provider, and otherwise managing all aspects of each luck-based game.

The illustrative embodiments comply with all applicable data privacy and administration rules, laws, and best practices. Any number of mobile devices, computers, machines, servers, arrays, or so forth may be utilized to implement the illustrative embodiments.

Cryptographic, security, or digital tokens may be exchanged for actual currency. Tokens may be utilized to perform wagers, bets, or support causes. The platform and system may also manage any number of smart contracts between relevant parties, such as the players, host/service providers, network operators, content providers, and so forth. The tokens utilized by the illustrative embodiments may be utilized for any number of purposes including initial wagers, anteing up, parlay wagers, charitable contributions, compensation, and so forth. The system may utilize multiple types of tokens (e.g., asset tokens, utility tokens, etc.) that are utilized together within the blockchain. Various smart contracts and/or decentralized applications may be self-executed to process and manage the various bets/wagers, sport scores, payout documentation, contributions, and transactions occurring on the blockchain. The illustrative embodiments including the systems, methods, devices, processes, and components described herein may implement any number of blockchain implementations.

The blockchain system may utilize crypto-protocols and crypto-token-protocols. For example, the blockchain system may accept known token types, mint unique tokens, manage a protocol utilizing a consensus algorithm, and record the transactions and other actions in a distributed ledger. The various protocols may be hosted on a public or private blockchains and may administer and control who, when, and how the various parties may control, interact, and otherwise manage the blockchain through any number of public and private permissions.

One example provides a platform, system, and method for a managing sports pools based on a football pool square game that utilizes smart contract management for the establishment of rules and real-time or near real-time blockchain based payouts for verified winners based on embedded and transparent logic with verified game stats or other verifiable outcomes. The various examples and embodiments are not limited by any game size or board layout configuration.

One example includes a 10×10 American football pool with the rules implemented as detailed below. Various users create profiles within a gaming platform (or platform) to join a football squares pool. The users select a bet and game type preference. Each game type and game payout is defined via a smart contract that indicates game rules, payout types, square preferences, square selections, number assignments, final scores, and winning numbers. As each game is filled with users, a new game or iteration of the same game may be generated for new players until the maximum number of players is reached a last bet cutoff time is met, or the start of the associated game is initiated.

Each player in a pool enters their wager and selects their square preference. Once the squares are filled the platform initiates a Random Number Generation (RNG) process that may be generated using a blockchain True Random Number Generator (TRNG) process or may utilize a Gaming Industry Regulation preferred Random Number Generation (RNG) process, depending on the gaming board requirement of each state or local authority and each blockchain vendors specific regulations. Once all the squares have been selected or filled, the RNG process randomly assigns the numbers. The platform randomly assigns numbers 0 through 9 to each row and column, until the home and away numbers are assigned to each row and column. This allows each square to represent a specific score in the game based on the assigned home and away numbers.

The smart contracts are used to determine each payout type. A winner may usually be determined at the end of the 1st quarter, 2nd quarter, 3rd quarter, final game score, and utilizing the reverse score. The winner may be determined through a digital or data-based confirmation of the final score of a game. The winner may be determined by the last number in each of the teams' score, and then matching those numbers on the grid and seeing which square intersects those two numbers. If the score at the end of the game is home team 23, and away team 14, then the square on the grid that has home team with number 3, and away team number 4, would be the winner. The reverse payouts may be paid out on the reverse of the score, so in this instance the away team 3 and home team 4 also receives a payout.

The smart contracts are used to determine each verified payout occurrence, based on the each verified final score of each game or event. A unique and novel feature of the illustrative embodiments allows for socially linked or non-socially linked players to participate in a football squares pool, with regulated near real-time blockchain-based payouts for winners.

In one example of a smart contract payout executed on the blockchain: Q1: 10%; Q2: 20%; Q3: 10%; Final: 40%; Final Reverse: 5%. House Payout 15%. In this example, the blockchain smart contract payout is executed as each event is verified, such as the score verification at the end of each quarter or the official end of the game. The payout formats and payout % may be customized or modified based on game type or game configuration.

FIG. 1 is a pictorial representation of a system 100 for managing gaming in accordance with an illustrative embodiment. In one embodiment, the system 100 of FIG. 1 may include any number of devices 101, networks, components, software, hardware, and so forth. In one example, the system 100 may include a smart phone 102, a tablet 104 displaying graphical user interface 105, a laptop 106 (altogether devices 101), a network 110, a network 112, a cloud system 114, servers 116, databases 118, a gaming platform 120 including at least a logic engine 122, a memory 124, data 126, tokens 127, and transactions 128. The data 126 may further include profiles 140, game information 142, betting information 144, and smart contracts 146. The cloud system 114 may further communicate with sources 131 and third-party resources 130. The various devices, systems, platforms, and/or components may work alone or in combination.

Each of the devices, systems, and equipment of the system 100 may include any number of computing and telecommunications components, devices or elements which may include processors, memories, caches, busses, motherboards, chips, traces, wires, pins, circuits, ports, interfaces, cards, converters, adapters, connections, transceivers, displays, antennas, operating systems, kernels, modules, scripts, firmware, sets of instructions, and other similar components and software that are not described herein for purposes of simplicity.

In one embodiment, the system 100 may be utilized by any number of players, organizations, or providers to plan, initiate, execute/implement, advertise, process, distribute, advertise, market, display, and/or monetize one or more games of chance. The games of chance are based completely on player luck and may be associated with sporting events, world events, political activities, or anything on which people have or will bet, wagered money, or gambled.

In one embodiment, the system 100 may utilize any number of secure identifiers/hashes (e.g., player identifiers, game identifiers, passwords, pin numbers, certificates, etc.), secure channels, connections, or links, virtual private networks, biometrics, or so forth to upload, manage, and secure a game and the associated data 126, generate tokens, communication information/data, and perform applicable transactions. As noted, the system 100 may be a blockchain system that utilizes a digital ledger to track profiles 140, game information 142, betting information 144, and smart contracts 146, tokens 127, transactions 128 involving the data 126 payouts, and advertisements 129. For example, the memory 124 may represent one portion or copy of digital ledger that may store the data 126, tokens 127, transactions 128, and advertisements 129 along with their updates, details, information, and data. The devices 101 are representative of multiple devices that may be utilized by players, gaming providers, and businesses, the devices 101 including but not limited to the devices 101 shown in FIG. 1. The devices 101 may utilize any number of applications, programs, scripts, sets of instruction, browsers, gateways, bridges, or interfaces to communicate with the cloud system 114, gaming platform 120, and/or associated components. The devices 101 may include any number of Internet of Things (IoT) devices.

The data 126 may include a number of different data types for managing the players and games. The profiles 140 may include profile data about individual players. The preferences, settings, and parameters of the profiles 140 may allow the players to specify the type and amount of data tracked by the gaming platform 120 as well as how, when, and where the data and information about the player within the profiles 140 may be utilized. The transactions 128 may represent payments, conversions (e.g., currency, cryptocurrency/tokens, etc.), trades, offers, payments, and so forth. The advertisements 129 may store the advertisements (e.g., for goods, services, and other products), marketing materials, or promoted content that are communicated, promoted, or used by the gaming platform 120. The players may represent individuals, families, groups, entities, businesses, aggregations, or other parties. In most cases, a player may represent an individual user accessing the gaming platform 120 through one of the devices 101.

The wireless device 102, tablet 104, and laptop 106 are examples of common devices 101 that may be utilized to participate in one or more games managed and hosted by the gaming platform 120. The devices 101 may assist the user in providing, receiving, managing, and communicating a profile, betting information, payouts and conversions, game information, data 126, transactions 128 or payments, advertisements 129, and other relevant data and information. For example, the various devices may capture selections from the user data that are utilized to implement the game as monetized. Other examples of devices 101 may include dedicated gaming devices, slot machines, e-readers, cameras, video cameras, audio systems, gaming devices, vehicle systems, kiosks, point of sale systems, televisions, smart displays, monitors, entertainment devices, virtual reality/augmented reality systems, or so forth. The devices 101 may communicate wirelessly or through any number of fixed/hardwired connections, networks, signals, protocols, formats, or so forth. In one embodiment, the smart phone 102 may be a cell phone that communicates with the network 110 through a 5G connection. The laptop 106 may communicate with the network 112 through an Ethernet, Wi-Fi connection, cellular, or other wired or wireless connection.

The data 126 may be captured based on the permissions, authorization, and confirmation of the host/service provider managing the gaming platform 120 as well as the player preferences stored within the profiles 140. The gaming platform 120 may also collect allowable information regarding the player over time to generate a robust profile for the player that enhances game play, entertainment opportunities, and advertising opportunities (where allowed).

In one embodiment, the gaming platform 120 may utilize applications, add-ins, instructions, or other content to integrated with other websites, applications, browsers, devices, or so forth. For example, the gaming platform 120 may interact with a browser extension that allow a traditionally non-gaming website to integrate gaming for increased business opportunities or fundraising.

The data 126 may capture information regarding the most popular games offered by the gaming platform 120 to best direct players to games that the user may be interested in. For example, a player using the wireless device 102 may interact with the gaming platform 120 to view and then participate in multiple games. The logic engine 122 may utilize the player profile to market similar games to other players that may have similar interests and/or profiles. In one embodiment, the data 126 may be captured through registered account information, programs/applications, website traffic, and tracking cookie-based analytics. For example, information such as time spent on each game website, features of an application, page views, clicks, conversions, relevant content, trends, and other information may be recorded as part of the data 126. The transactions 128 may include digital, online transactions 128 or through known blockchain coin vendors or performed through services, such as PayPal, Venmo, Zelle, Google, Square, WePay, Skrill, Payza, Stripe, Dwolla, Amazon Pay, 2checkout, and other similar services. The transactions 128 may include payouts to the winning player(s).

The data 126 may be captured through direct interaction with the user through the devices 101. The devices 101 may utilize any number of mobile applications, social media applications, browsers, or so forth. Additional user or gaming data may be gathered through real-time polls, surveys, questionnaires, point-of-sale transactions, likes and dislikes, feedback, historical actions, preferences for media content, site traffic, interests, and numerous other applicable data. Any number of mobile, computing, personal assistant (e.g., Siri, Alexa, Cortana, Google, etc.), or other applications may be utilized to make selections, participate in the game, or otherwise interact with the gaming platform 120.

The data 126 may also include location-based information and communications. For example, the location-based information may determine which local, county, State, province, or country regulations apply. The location-based information may also be utilized to determine nearby players, associated physical locations, and other applicable information for enhancing the gaming experience for the players.

The data 126 may also include surveys and questionnaires. Responses to surveys and questionnaires may be one of the best ways to gather and inform information regarding the user's demographics, interests, and preferences that may not be able to be determined in other ways due to privacy, entity names, applicable laws, and so forth. The ability to gather real-world consumer insights may help complete or round out a user profile. The surveys and questionnaires may be performed digitally (e.g., websites, extensions, programs, applications, browsers, texting, or manually (e.g., audibly, on paper, etc.).

The cloud system 114 may aggregate, manage, analyze, and process selections, data 126 and tokens across the Internet and any number of networks, sources 131, and third-party resources 130. For example, the networks 110, 112, 114 may represent any number of public, private, virtual, specialty (e.g., trading, financial, cryptocurrency, etc.), or other network types or configurations. The different components of the system 100, including the devices 101 may be configured to communicate using wireless communications, such as Bluetooth, Wi-Fi, near field communications, or so forth. Alternatively, the devices 101 may communicate utilizing satellite connections, Wi-Fi, 3G, 4G, 5G, LTE, personal communications systems, DMA wireless networks, and/or hardwired connections, such as fiber optics, T1, cable, DSL, high speed trunks, powerline communications, and telephone lines. Any number of communications architectures including client-server, network rings, peer-to-peer, n-tier, application server, mesh networks, fog networks, or other distributed or network system architectures may be utilized. The networks, 110, 112, 114 of the system 100 may represent a single communication service provider or multiple communications services providers.

The sources 131 may represent any number of clearing houses, web servers, service providers (e.g., trading platforms, credit card companies, transaction processors, etc.), distribution services (e.g., text, email, video, etc.), media servers, platforms, distribution devices, or so forth. In one embodiment, the sources 131 may represent the businesses, organizations, or other groups that purchase, license, access or utilize the gaming platform 120 and data 126. In one embodiment, the cloud system 114 (or alternatively the cloud network) including the gaming platform 120 may be specially configured to perform the illustrative embodiments and may be referred to as a system or platform.

The cloud system 114 or network represents a cloud computing environment and network utilized to manage games and aggregate, process, manage, generate, and distribute data 126 and advertisements 129 while implementing the transactions 128 and utilization. The cloud system 114 may implement a blockchain system for managing the game, data 126, transactions 128, and advertisements 129. For example, any number of blockchain tokens may be utilized to manage the data and ensure proper compensation of the players, game hosts, and/or service providers. The cloud system 114 may allow data 126, transactions 128, and advertisements 129 from multiple players, businesses, managers, or service providers to be centralized. In addition, the cloud system 114 may remotely manage configuration, software, and computation resources for the devices of the system 100, such as devices 101. The cloud system 114 may prevent unauthorized access to the games, data 126, transactions 128, advertisements 129, tools, and resources stored in the servers 116, databases 118, and any number of associated secured connections, virtual resources, modules, applications, components, devices, or so forth. In addition, a user may more quickly upload, aggregate, process, manage, view, and distribute data 126 (e.g., profiles, selections, game data/rules, content, etc.), transactions 128, and advertisements 129 where authorized, utilizing the cloud resources of the cloud system 114 and gaming platform 120.

The cloud system 114 may allow the overall system 100 to be scalable for quickly adding and removing players, games, businesses, administrators, government officials, authorized advertisers, interest-based information, transaction-based information, analysis modules, distributors, gaming logic, algorithms, moderators, programs, scripts, filters, transaction processes, distribution partners, or other users, devices, processes, or resources. Communications with the cloud system 114 may utilize encryption, secured tokens, secure tunnels, handshakes, secure identifiers (e.g., passwords, pins, keys, scripts, biometrics, etc.), firewalls, digital ledgers, specialized software modules, or other data security systems and methodologies as are known in the art.

Although not shown, the cloud system 114 may also include any number of load balancers or intelligent network devices. The load balancer may be one or more devices configured to distribute the workload of processing the uploaded data 126 as well as applicable transactions 128 and advertisements 129 to optimize resource utilization, throughput, and minimize response time and overload. For example, the load balancer may represent a multilayer switch, database load balancer, or a domain name system server. The load balancer may facilitate communications and functionality (e.g. database queries, read requests, write requests, command communications, stream processing, etc.) between the devices 101 and the cloud system 114. For example, the cloud system 114 may offload verification of users that seek to be added to the system 100 along with applicable data 126 and information. Load balancing may be performed between automatic systems and devices as well as individual users. Other intelligent network devices may also be utilized within the cloud system 114.

The servers 116 and databases 118 may represent a portion of the gaming platform 120. In one embodiment, the servers 116 may include a web server 117 utilized to provide a website, mobile applications, and user interface (e.g., user interface 105) for interfacing with numerous players. For example, a player may utilize the wireless device 102 to access a web enabled game that is hosted by the gaming platform 120 through the cloud system 114. Information received by the web server 117 may be managed by the gaming platform 120 managing the servers 116 and associated databases 118. For example, the web server 117 may communicate with the database 118 to respond to read and write requests. For example, the servers 116 may include one or more servers dedicated to implementing and recording blockchain transactions and communications involving the data 126, transactions 128, and advertisements 129. For example, the databases 118 may store a digital ledger for updating information relating to the players' data 126 and transactions 128 as well as advertisements 129 received by the player. For example, the user's data 126 may be packaged in digital tokens that may be securely communicated to any number of relevant parties.

The databases 118 may utilize any number of database architectures and database management systems (DBMS) as are known in the art. The databases 118 may store the content associated with each user/consumer/purchaser profile which may specify an address, name, deidentified profile, age, demographics, interests, family/friend information, biometric identifiers, payment information, permissions, settings, location, cause preferences, cause restrictions, and so forth. Any number of secure identifiers, such as tones, QR codes, serial numbers, or so forth may be utilized to ensure that game, content, personal, or transaction information is not improperly shared or accessed. The databases 118 may include all or portions of a digital ledger applicable to one or more blockchain transactions including token generation, management, exchange, and monetization.

The user interface 105 may be made available through the various devices 101 of the system 100. In one embodiment, the user interface 105 may represent a graphical user interface, audio interface, or other interface that may be utilized to play the games, manage data 126, transactions 128, and other information. For example, the player may enter or update associated data utilizing the user interface 105 (e.g., browser or application on a mobile device). The user interface 105 may be presented based on execution of one or more applications, browsers, kernels, modules, scripts, operating systems, or specialized software that is executed by one of the respective devices 101. For example, one or more games may be presented through the user interface 105.

The user interface 105 may display current and historical data 126 as well as trends for the games. The user interface 105 may be utilized by administrators or players to set the player preferences, gaming preferences, parameters, and configurations of the devices 101 as well as upload and manage the data 126, content, and implementation preferences sent to the cloud system 114. The user interface 105 may also be utilized to communicate the advertisements 129 to the user. The devices 101 (e.g., displays, indicators/LEDs, speakers, vibration/tactile components, etc.) may present, play, display, or otherwise communicate the games visually, audibly, tactilely, or any combination thereof.

In one embodiment, the system 100 or the cloud system 114 may also include the gaming platform 120 which may be one or more devices utilized to initiate, enable, generate, aggregate, analyze, process, and manage data 126, transactions 128, advertisements 129, and so forth with one or more communications or computing devices. The gaming platform 120 may include one or more devices networked to manage the cloud network and system 114. For example, the gaming platform 120 may include any number of servers, routers, switches, or advanced intelligent network devices. The gaming platform 120 may represent one or more web servers that perform the processes and methods herein described. The cloud system 114 may manage blockchain management of the data 126 utilizing blockchain technologies, such as tokens, digital ledgers, hash keys, instructions, game identifiers, player identifiers, and so forth.

In one embodiment, the logic engine 122 may be the logic that controls various algorithms, programs, hardware, and software that interact to implement the games and receive, aggregate, analyze, rank, process, score, communicate, and distribute data 126, content, transactions 128, advertisements 129, alerts, reports, messages, or so forth. The logic engine 122 may utilize any number of thresholds, parameters, criteria, algorithms, instructions, or feedback to interact with players, hosts, advertisers, and other interested parties and to perform other automated processes. In one embodiment, the logic engine 122 may represent a processor. The processor is circuitry or logic enabled to control execution of a program, application, operating system, macro, kernel, or other set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may be a single chip or integrated with other computing or communications elements.

In one embodiment, the logic engine 122 may generate random numbers and random box assignments for each iteration of the squares game or the player profile may indicate a square placement preference prior to the random number generation process. The purchase of the squares, game rules, and game payouts may be associated with a smart contract that implements payments (e.g., initial wager, payouts, etc.) and participation through smart tokens and blockchain tracking.

The memory 124 may be a hardware component, device, or recording media configured to store data for subsequent retrieval or access at a later time. The memory 124 may be static or dynamic memory. The memory 124 may include a hard disk, random access memory, cache, removable media drive, mass storage, or configuration suitable as storage for data 126, transactions 128, instructions, and information. In one embodiment, the memory 124 and logic engine 122 may be integrated. The memory 124 may use any type of volatile or non-volatile storage techniques and mediums. In one embodiment, the memory 124 may store a digital ledger and tokens for implementing a blockchain processes. The memory 124 may also store player profiles, game profiles, bank account information, preferences, and other applicable information.

In one embodiment, the cloud system 114 or the gaming platform 120 may coordinate the methods and processes described herein (e.g., flowcharts, methods, etc.) as well as software synchronization, communication, and processes. The third-party resources 130 may represent any number of human or electronic resources utilized by the cloud system 114 including, but not limited to, businesses, entities, organizations, individuals, government databases, private databases, web servers, research services, and so forth. For example, the third-party resources 130 may represent advertisement agencies, gaming services, government groups, marketers, e-commerce companies, verification services, credit monitoring services, blockchain services, payment providers/services, and others that pay for rights to use the data 126, track or provide information regarding the transactions 128, and create or monitor utilization of the advertisements 129.

In one embodiment, the gaming platform 120 may implement a blockchain ledger, manager, or technology. In another embodiment, the blockchain ledger may be accessible through sources 131. Any number of existing, developing, or future blockchain technologies, companies, or providers may be utilized (e.g., Aeternity, Ethereum, Bitcoin, Dfinity, ContentKid, Blockphase, Chain of Things, Flowchain, Decissio, Cognate, SkyHive, Safe, SALT Lending, Gemini, Circle, Coinbase, Chronicled, IBM, Voatz, Steem, Shipchain, etc.).

The blockchain may be utilized as a way to implement, track, store and communicate the data 126, transactions 128, and advertisements 129 related to the games. The blockchain may utilize one or more distinct ledgers for different games, players, entities, services providers, types of data, or so forth. For example, each new player with data received by the gaming platform 120 may be assigned a secure identifier/hash, token, or other secure identifier. In one embodiment, the digital tokens may be managed utilizing a key that allows the administrator or controlling party to access the ledger. In one example, the tokens may be controlled by the user or control may be reassigned. The blockchain may cross-reference updates to the data 126 with the original record for the gaming platform 120 to ensure proper maintenance, control, licensing, management, and transactions 128. In one example, different licensing tiers, pricing algorithms, license verification, game configurations, and payments are combined to create a unique platform. The illustrative embodiments provide a system 100, cloud system 114, and gaming platform 120 for using player data, game data, or so forth to generate selective or targeted advertising. The illustrative embodiments are performed based on the player's request, authorization, or approval to apply with all applicable laws.

The blockchain may also utilize any number of blockchain-based or standard digital payment systems (e.g., PayPal, Venmo, Dwolla, Square, wire transfers, credit cards, Quicken, etc.) to receive money and distribute payments to the applicable player or party. In one embodiment, the gaming platform 120 may receive a hosting fee, percentage (e.g., per game, transaction which is typically 15% of the pot to the platform/house/service provider, etc.), data uploaded/updated, data purchased, shared, or licensed, purchased item, browsing session, or so forth. In one embodiment, the gaming platform 120 may be utilized to verify players, beneficiaries/hosts, and advertisers (as well as other users/entities that utilize the gaming platform 120) and associated data 126 and transactions 128 associated with the data 126.

The third-party resources 130 may represent any number of electronic or other resources that may be accessed to perform the processes herein described. For example, the third-party resources 130 may represent government, private, and charitable servers, databases, websites, programs, services, and so forth for verifying the data 126, transactions 128, and the advertisements 129. In another example, auditors may verify the advertisements 129 are generated based on the data 126 including the transactions 128.

Various data and venue owners that access the gaming platform 120 may legally extract and tokenize the data 128, transactions 128, and advertisements for use in the exchange provided by the system 100 by identifying and tracking data utilizing automatic data extraction tools. Any number of privacy and data policies may be implemented to ensure that applicable local, State, Federal, and International laws, standards, and practices are procedures are met.

The gaming platform 120 may capture legal data and information from the devices 101 or sources 131 for monetization. The illustrative embodiments may also support third-party utilization of the data 126 and transactions 128 to generate the advertisements 129, marketing, perform research, or otherwise verify information. Various authorization, auditing, licensing, and validation processes may be performed by auditing groups, gaming commissions, industry groups, or other professionals/entities to ensure that the games, betting, RNG, and payouts are carried out fairly, transparently, and equitably. The various embodiments may also allow a user to donate the value of their data 126 and transactions 128 and consumption of advertisements 129.

In one embodiment, the logic engine 122 may utilize artificial intelligence. The artificial intelligence may be utilized to enhance data 126, analyze transactions 128, and generate advertisements 129 to increase value, fair play, utilization, effectiveness, and profits. For example, artificial intelligence may be utilized to review, authenticate, and validate game selections, data 126, and transactions 128 that are received by the system 100. The artificial intelligence of the logic engine 122 may be utilized to ensure that the data 126 is improved, accurately analyzed, and value increased.

In another embodiment, the devices 101 may include any number of sensors, appliances, and devices that may utilize real time measurements and data collection to update the data 126. For example, a sensor network, wearables (e.g., watches, bands, implantable devices, etc.) and Internet of things (IOT) devices may gather user and behavioral data. The gaming platform 120 may also work in conjunction with hands-free data mining and measurement tools that track location, activity, and video-based marketing data (e.g., from GPS location, video from storefronts, beacon detection, proximity alerts, etc.) from any number of third-party sources. The player may be tracked through any number of environments, locations, and conditions. The advertisements 129 may also be generated based on the activities, actions, and locations of the players.

In one embodiment, the gaming platform 120 may extract data from third-party platforms by opting in and providing user credentials, (e.g., Single Sign On (SSO) tokens, API tokens, etc.) to various applications (e.g., banking, cryptocurrency, social media, texting, email, etc.). The gaming platform 120 may extract data 126 from the sources 131.

Figure 2:
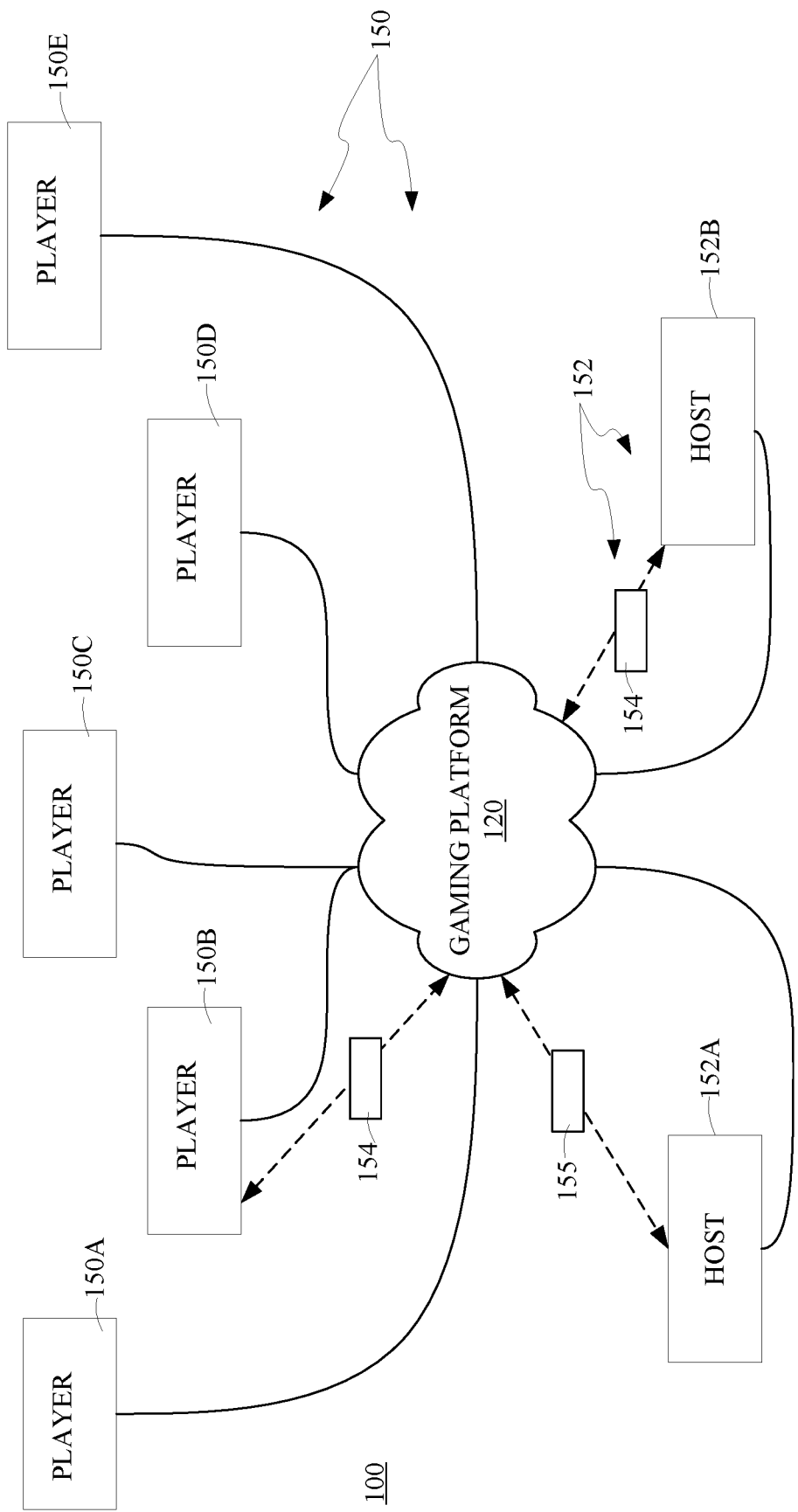
FIG. 2 further illustrates portions of the system of FIG. 1 in accordance with an illustrative embodiment.

FIG. 2 further illustrates portions of the system 100 of FIG. 1 in accordance with an illustrative embodiment. As shown, the players 150A-E (jointly players 150) may represent individuals or groups that utilize the devices 101 of FIG. 1. The players 150 may represent any number of individuals, couples, families, groups, businesses, entities, organizations or so forth referred to as players 150 for purposes of simplicity. The hosts 152A, 152B (jointly hosts 152) represent any number of service providers, gaming companies, casinos, charitable organizations, or others that host, sponsor, manage, or organize one or more games for the players 150. The data 154 may be generated by the players 150, the gaming platform 120, or the hosts 152. In one embodiment, the gaming platform 120 may represent all or portions of the system 100 of FIG. 1 (including the cloud system 114, servers 116, databases 118, and gaming platform 120).

The hosts 152 may actively or passively upload data 154 to the gaming platform 120. The data 154 may include rules, parameters, limitations, requirements, legal documentation, details, graphics, wager information, player information, and so forth. The gaming platform 120 may also receive, amend, update, or add additional data 154 for the hosts 152 or the players 150 at any time as described herein. The hosts 152 may have an agreement (e.g., smart contract, gaming limitations, terms of services, permissions, authorizations, etc.) for the utilization of the data 154 by the players 150 or other interested parties to initiate, participate, wager, communicate, and otherwise play the one or more games provided by the hosts 152. The agreement or smart contract may specify how, when, and what portions of the data 154 may be used as well as the associated rules/limitations, gaming, and compensation terms. The smart agreement may specify that the data 154 may be processed, analyzed, purchased, licensed, rented, leased, or otherwise managed by the gaming platform 120 for the mutual benefit of the hosts 152 and the players 150. For example, the host 152B may elect to host targeted advertisements 155 to support the games utilized by the players 150. As a result, the hosts 152 may reduce the costs, fees, or expenses associated with the players 150 participating in one or more games. Free games may generate revenue for the hosts 152 completely dependent on advertisements communicated to the players 150 through the game (e.g., visual, audio, video, etc.). In other examples, the hosts 152 may generate targeted advertisements based on the user profiles, data, or so forth. In another example, the host 152B may elect to license use of their data 154 such that they are compensated utilizing a digital currency (or hard currency) for each access of or utilization of their data 154 by interested parties (e.g., marketers, advertisers, research and development groups, etc.).

The gaming platform 120 may process raw consumer data to generate the targeted advertisements 155. The targeted advertisements 155 may be desirable to the host because the targeted advertisements 155 may provide a source of income for the hosts 152 to generate and manage the games that the players 150 play.

In one embodiment, the data 154 may include tokens that are utilized to implement wagers, selections, and/or transactions. The tokens may include a pointer to a secure storage or vault accessed through the gaming platform 120. The pointer may be an encryption key, access information, unique identifier, or other security information for accessing the data 154 associated with the user. In another embodiment, security tokens used for the blockchain may also be embedded with the data 154. The tokens granted through the gaming platform 120 may vary in value, may be fixed, or may act similar to other monetary instruments (e.g., cash, debit amount, coupon, discount, stocks, bonds, certificates of deposit, etc.) for a specified original value of the data 154.

The gaming platform 120, players 150, or hosts 152 may keep and maintain digital ledgers that track the transactions within the system 100 to verify and authenticate the data 154, advertisements 155, and associated transactions. The players 150 may utilize the data 154 to make selections, wagers, communicate with friends/players, or otherwise participate in the game. As previously noted, the gaming platform 120 may also represent one or more processing, analysis, blockchain, or distribution centers, systems, devices, facilities, or so forth. The players 150 and hosts 152 may represent any number of individuals or groups (e.g., hundreds, thousands, millions, etc.).

In another embodiment, the gaming platform 120 may perform distribution of payouts, prizes, products, collectibles, advertisements 155, and goods and services 154. For example, the gaming platform 120 may include or be integrated with any number of physical storages, digital storage, warehousing, shipping and distribution systems, facilities, professionals, employees, contractors, electronics, and so forth.

The system 100 and gaming platform 120 may be a unique portion of a blockchain system that enables for user data to be securely accessed through tokens that may be created, modified, vended, and otherwise transacted.

Figure 3:
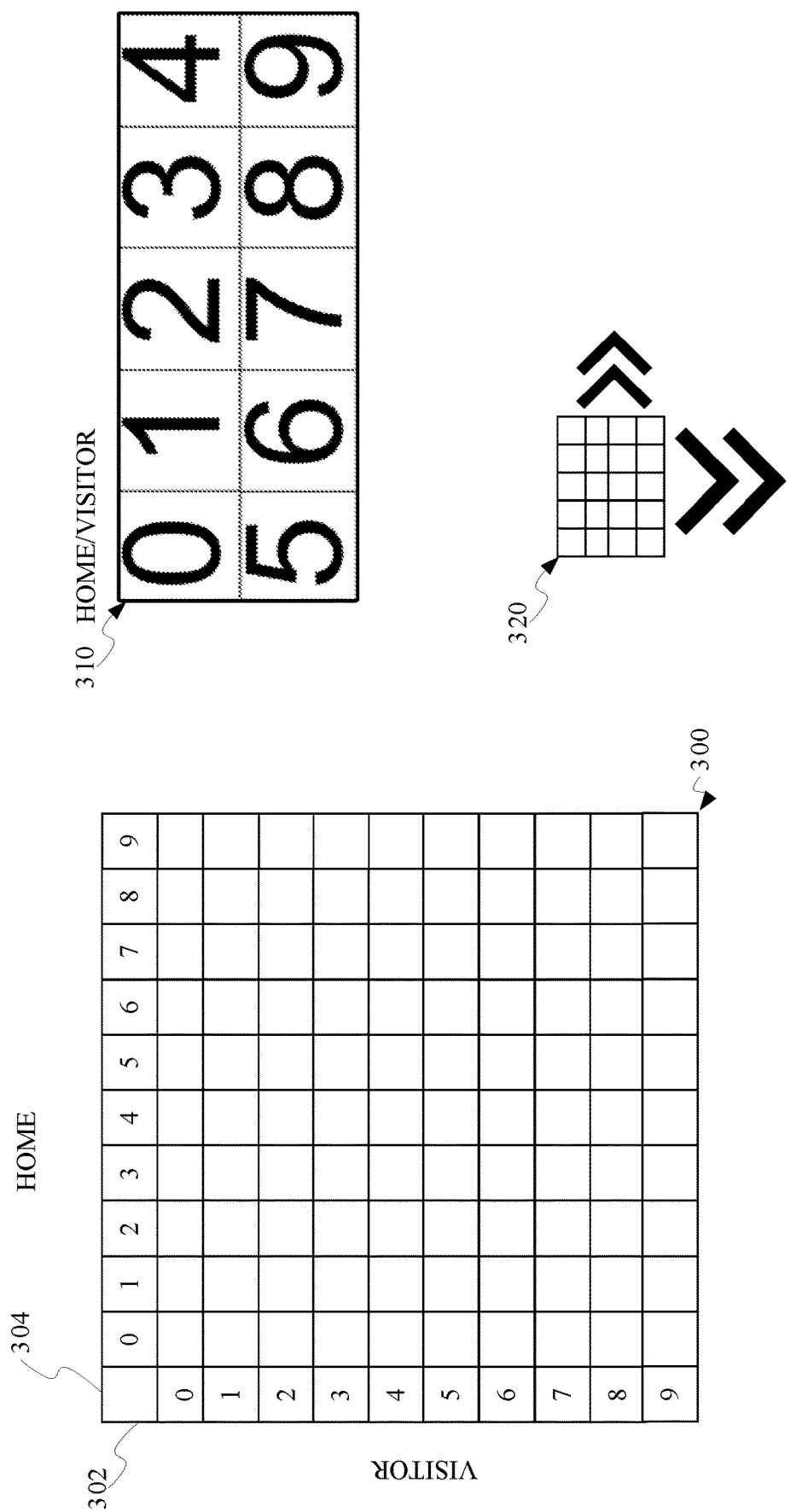
FIG. 3 is a pictorial representation of squares associated with a game in accordance with an illustrative embodiment.

FIG. 3 is a pictorial representation of squares associated with a game in accordance with an illustrative embodiment. The squares games of FIG. 3 may represent any number of games that are played electronically (e.g., smart phone, dedicated gambling device, gaming console, browser, etc.), on paper, remotely, in-person, utilizing scratch-offs, or utilizing any number of other formats. For example, FIG. 3 may show examples of user interfaces that may be utilized to provide applicable information. The various versions of the user interfaces may also display player information (e.g., name/nickname, avatar, preferences, active participation, limits, etc.), ongoing games the player is participating in, available games, gaming information, betting information, games/events streamed, scores, finals, and so forth.

In one embodiment, a game is a 10×10 square game 300. A first team (home team) may be associated with a top row 302 of numbers. A second team (away team) may be associated with a vertical column 304 of numbers. Players may select square preferences or may be randomly assigned any of the squares prior to the associated randomly generated numbers assignments. In one embodiment, the platform may select and assign each player (or player profile) a set of numbers or the player profile may indicate a square placement preference for each blank square selection for the entire game, inning, quarter, half, period, or so forth. In some embodiments, the assigned numbers or number ranges, players stats, teams, and box placement selections and so forth may be applicable for multiple games, playoffs, entire seasons, or indefinitely pending modification by the user.

A game 320 may also represent portions of a score for a game. For example, the game 320 may be utilized for a soccer game with scores associated with each team of the match. The game 320 is not limited to any fixed square format and may represent a square of any size, such as 8×8, 16×16, 25×25, 50×50, 100×100, 125×125. For example, the 50×50 square may have numbers from 0 to 50 with each number assigned to a square and may be used for a football game. If the score is higher than 50, the 50 square is considered the winner. Alternatively, the game may be considered a push, all money may be returned, or each player may receive an even split of the winnings. 100×100 squares or 125×125 or 150×150 squares may be utilized for college or professional basketball. A single game 320 (e.g., a grid of squares) may be utilized for the March Madness NCAA Tournament, final four games, or championship games. A game 310 shows an example where a 2×5 square is used for the ending score of either (or both) the home team and the visiting team. Game 310 illustrates that any size of square game or configuration may be utilized.

In games that are lacking players or may not fill up by game time the game 320 may be downsized to accommodate a smaller group and is represented as a 5×5 square (i.e., 25 squares) with each players' square representing four different number combinations. A 5×5 square with two sets of numbers may also be implemented per quarter, half, three quarters, and/or for the final score and reverse.

In one embodiment, artificial intelligence, machine learning, and/or gaming logic associated with the platform may determine the score range to determine the configuration of the game 320. For example, a game 320 may be created for boxing or MMA that represents the rounds in a fight, strikes, take downs, knock downs, or so forth. Special payouts may occur based on the round of a knockout, minute of a knockout, fights that go all of the rounds (e.g., 5, 6, 12, etc.) or so forth. A game 320 may also be created for horse racing with a square for each horse in the race. The winning player may receive a maximum payout with lower payouts for the $2^{nd}$ and $3^{rd}$ place finishers. The game 320 may be created for Olympic events with each country participating in an event representing a box in the square.

In one embodiment of the game 320 called "survivor" a player may be issued a square that requires the player to select or be assigned a team for a specific number of games. If that team wins 50% or more of their games of the game range, the surviving players pick another team the next week going on and on until there is a winner. There may be limitations that each player is required to select a different team each week or game.

In another embodiment, called "love 'em or hate 'em", or "season pick em" the game may be created with 32 entries for 32 teams (or n entries for n teams). Each player may be assigned a team at random or may select their team. Winners may be paid out by the first team to complete a milestone, specific statistic, or win metric. In one example, the game 320 may represent squares used for NFL, NBA, MLB, College, playoffs, and finals. The square may be customized into any format to conform to playoff configurations, with the standard single game best represented the standard 10×10 five payout formats. The second box may be an 8×8 team box which may be configured in any order depending on the combination of the teams that are in the finals.

In another example, professional sports players within a league may be categorized into groups for any sport with a wagering player profile assigned to each square that may be randomly assigned or selected by players. Some professional sports players categorization examples include American League Short Stops, NFC Running Backs, Western Conference Point Guards, and so forth. The player profile who led the league in predefined statistics is the winner. The format may also be used for MVP, All Star, Pro Bowl, or other team/individual awards. The process may be applicable across any sport or sporting metric.

The platform and associated games may facilitate upgraded or parlay bets that allow the players to upgrade their wager and may offer double or nothing or other types of parlay wagers to retain bettor interest. The platform can provide several betting options at the winner's confirmation window. An example of a parlay bet is where the winning players may elect to upgrade their initial winning numbers for a chance at a new parlay pool where the winner is paid out in increased implements.

In one embodiment, entry into the game 320 and parlay bets may be shared outside of the platform with players earning automatic entries in open pools via sports betting sites, such as Fan Duel, Draft Kings, Bet America, or others. This partner relationship may provide cross-pollination for customers of applicable partners, associates, and affiliates to generate new player acquisitions and fees that are financially or mutually beneficial.

In another example, the platform follows "Knockout" or "Cover the Spread" pool rules. Players may select a team or be assigned a team at random. If playoffs are one game, a point spread may be utilized. The payout event may always end at a half, to and end of game to ensure there will always be a winner. If the winning team does not cover the point spread, the losing team takes over the winning team's spot. Winning teams that do not cover the spread are eliminated. This may continue throughout the whole playoffs/tournament until there is one team left.

The illustrative embodiments provide an improved pari-mutuel gaming platform with blockchain based payouts. Pari-mutuel betting is a type of bet in which the bettor is going up against others in a pool with the host getting a percentage of the wagers without going up against "the house" or a "bookmaker." All wagers go into a pool and the pool is shared between those who make or are assigned the winning selection. The illustrative embodiments allow games to automatically and fairly be established utilizing blockchain smart contracts, thereby removing the need for a house to manage each Pari-mutuel wager.

For proposition bets or future prediction bets, the inclusion of the wagers viability element of each bet placed on the blockchain allows the free market to determine the viability of each bet. If a bet is not practical (e.g., not enough participants, stakes are too low/high, etc.), the game will not fund, and all the players may have their money returned or the money/tokens will not be entered in the first place. Fees, expenses, or a cut of the overall amount wagered, individual wagers, winnings, or other propositions may be given to the platform/host/service provider to ensure continued operation and fair play.

In games where the squares selections are split evenly among player profiles, each player profile may uniformly select each square preferences or may be issued a randomly generated square until each square is assigned to each profile. In another embodiment, random numbers may be assigned to each player, a purchased square designating the order in which the squares may be selected by the players. As a result, the number of squares available may be selected by the players or may be assigned in an order that is completely random, thereby encouraging experienced/professional players as well as beginners/newcomers to participate. The players may be limited regarding the maximum number of squares that may be purchased per game, season, set of games, or so forth. The game profile may specify the limitations regarding the game.

The squares may be selected/assigned and documented utilizing the blockchain with ownership indicated with a unique identifier for the square and/or player. Documentation and verification may be utilized to ensure that squares are split between the specified number of players and no players are allowed to purchase more than a specified number of squares.

In one example (see the square game 300), a winner may be determined for each quarter 1 through 3, the final score, and the reverse of the final score from the assigned winning groups of squares with the game profile (e.g., rules, parameters, format, type, etc.) used to determine a winner based on the game profile. In the 10×10 format, winners may be determined at the end of each quarter and the end of game final score, which includes overtime, and on the reverse and payouts may be awarded to the winner who owns the square that has the exact last number of each team's score at the end of each quarter and may also payout on the reverse. For a standard payout example, if the square at the end of the first quarter is 27 for the home team and 23 for the away team, the winner is the player who owns the home team square with a 7 and the away team with a 3. In the revere example the player with the away team 7 and the home team 3 also receives a reverse payout. In other examples, there may be squares for the first digit of the score as well (01, 11, 21, etc.). The square game 300 may be reduced in size or used with limited numbers (e.g., tennis) for games that are naturally lower scoring (e.g., soccer, baseball, tennis, etc.). As a result, square games may be configured for any type of game.

For a payout, the player profile that owns the square that matches the last number in the scores of both the home and away team's score may be paid out at the end of each quarter based on smart contract requirements with each winner paid out automatically in real-time via the blockchain. In another example, the assigned numbers may rotate for each inning, quarter, period, frame, set, round, or other portion of the game (e.g., defined by time/time period, event, scoring, penalty, etc.). As a result, a player/player profile may have multiple chances to win with different sets of numbers thereby improving the odds of winning for any game type and increasing player engagement.

The gaming platform may be used to wager on a single team, preseason game(s), a set of games, a full season, playoff games, tournaments, and so forth. In one embodiment, the squares game may have 32 single entries for 32 teams, and each player may be assigned a team at random, or a random order may be assigned to the players for selection a team. The number of teams may vary. For example, for the NCAA basketball tournament, 64+ teams may be randomly assigned or selected (i.e., 68 teams are currently selected with a pre-tournament playoff).

The wagers on the various games may correspond to traditional bets, special side bets, rewards, and payouts that are managed by smart contracts and paid based on the smart contract terms. In addition to the winners of the game, wagers may also be based on awards, record-breaking moments, highlights, team statistics, position (e.g., $2^{nd}$, $3^{rd}$, $4^{th}$, etc.), and other information. The gaming platform may be configured to receive requests and feedback for implementing any number of new games based on requests from the players. In one embodiment, if the information is already available, artificial intelligence of the gaming platform may automatically create games and make the newly created games available privately or publicly while ensuring that the odds are fair for all players, the rules are transparent, and the results are equitable for the winner and all players.

The size of the prize pools may be determined by the buy-in-fee, total number of players entered, type/configuration of games, host/service provider fees and expenses, and so forth. The games may be publicly available or private. Public games may be seen and joined by anyone and communicated publicly. Private games may be limited to a particular group of individuals or implemented by invitation only. Private games may be joined through an email, text, direct message, password, QR code, network, proximity, location, inaudible tone, or so forth. For example, a QR code may be shared among a group of friends or a restaurant to implement a localized version of the game. The gaming platform may enable the game while only requiring a small hosting fee.

The following are wager range examples that may be utilized for one of the games. In one example, the betting topic may be based on how many number one seeds will make it to the final four in 2024 in the College Men's Basketball Championship with squares for 0 to 4: 0 +1000, 1 +200, 2 +145, 3 +350, and 4 +1600.

In another wager range example, the betting topic may be based on how many buzzer beating shots will occur during the round of 64 during the 2023 March Madness Tournament from 0 to 9: 0 −145, 1 +225, 2 +700, 3 +1200, 4 +2000, 5 +3000, 6 +1200, 7 +700, 8 +225, 9 +145. Any number of different variations of this example may be utilized.

Figure 4:
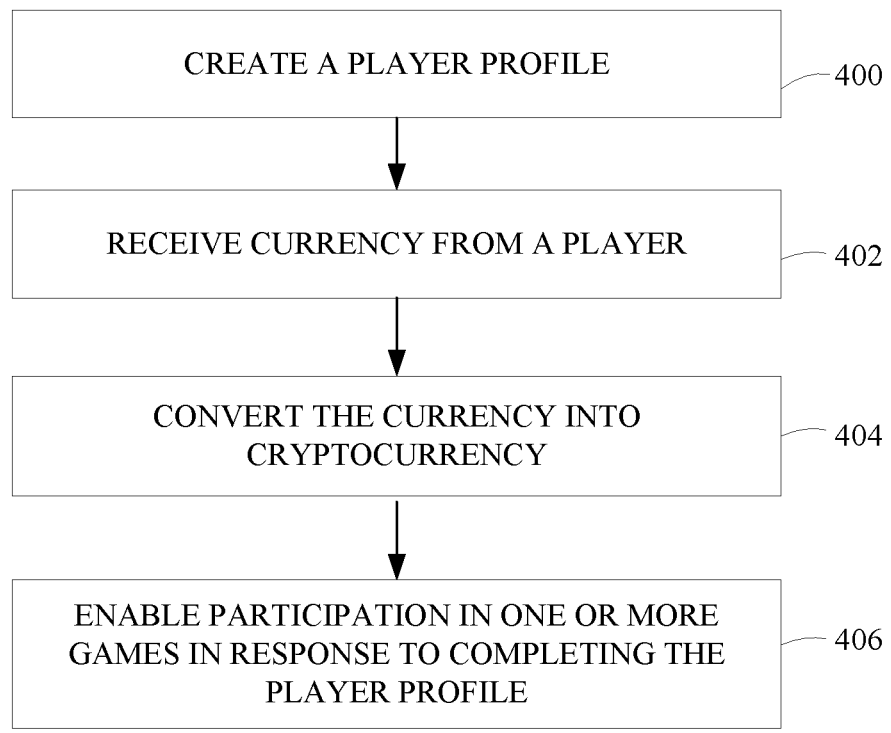
FIG. 4 is a flowchart of a process for create a player profile in accordance with an illustrative embodiment.

FIG. 4 is a flowchart of a process for creating a player profile in accordance with an illustrative embodiment. The process of FIGS. 4-9 may be performed by a platform, device, server, or other equipment in accordance with illustrative embodiments (see for example the devices, servers, systems, and equipment of FIG. 1). All or portions of the steps or processes of FIGS. 4-9 may be performed automatically. The process of FIG. 4 may be implemented by a system or platform, such as the system 100, gaming platform 120, or devices 101 of FIG. 1 referred to generically herein as the platform. The steps of FIGS. 4-9 as well as the systems, devices, configuration, method, and components of FIGS. 1, 2, and 3 may be combined in any order, integrated, or otherwise combined as useful regardless of limitations, restrictions, or divisionals that may be naturally or artificially imposed on the associated content.

The process may begin by creating a player profile (step 400). The player profile may include information, such as name, profile name, age, address, billing/payment information, game preferences, communications details/preferences (e.g., in-app messages, text messages, emails, etc.), and other applicable information. In some embodiments, the user may provide additional information regarding demographics, hobbies, occupation, interests, or so forth through data sharing with one or more applications, browsers, or other profiles. The profile may ensure that each player is unique. The player profile may also include a bank account or credit card that is on file with the platform for performing any number of transactions. All or portions of the player profile may be deidentified from the user to protect the identity and privacy of the player. The player profile may include a visible portion, such as a username, player identifier (e.g., number, code, etc.), or other information. The player identifier may be utilized as information used by the blockchain.

Next, the platform may receive currency from a player (step 402). The platform may accept payments from bank accounts debit cards, credit cards, payment platforms (e.g., Venmo, PayPal, Stripe, Square, Zelle, etc.), or other payment needs. Currency may also be accepted in cryptocurrency formats. Any number of worldwide currencies may be received and processed by the platform. In one embodiment, the platform may communicate with other cryptocurrency exchanges or platforms to receive cryptocurrency directly without the need for conversion (see step 404). Other cryptocurrency exchanges may work with the platform.

Next, the platform may convert the currency into crypto currency (step 404). One or more dedicated cryptocurrencies (e.g., Ethereum, BitCoin, XRP, Tether, etc.) and tokens may be utilized by the platform for payments and compensation of the winners, host, and/or others. The platform may include an exchange that provides players the most favorable rate possible for conversions. Transactions within the platform may be performed for fractional shares of tokens/units.

Next, the platform may enable participation in one or more games in response to completing the player profile (step 406). The platform may ensure that each player is eligible and authorized to play on the platform and in applicable games. In one embodiment, the platform may prevent players that are known cheaters, have cheated in the past, are known criminals, are underage, or otherwise ineligible from participating in the platform and establishing a profile (e.g., prevention during step 400). The player may select when and how she/he participates in the available games. The platform may present a number of gaming options available to the user based on the player preferences, location, age, and other applicable information.

Figure 5:
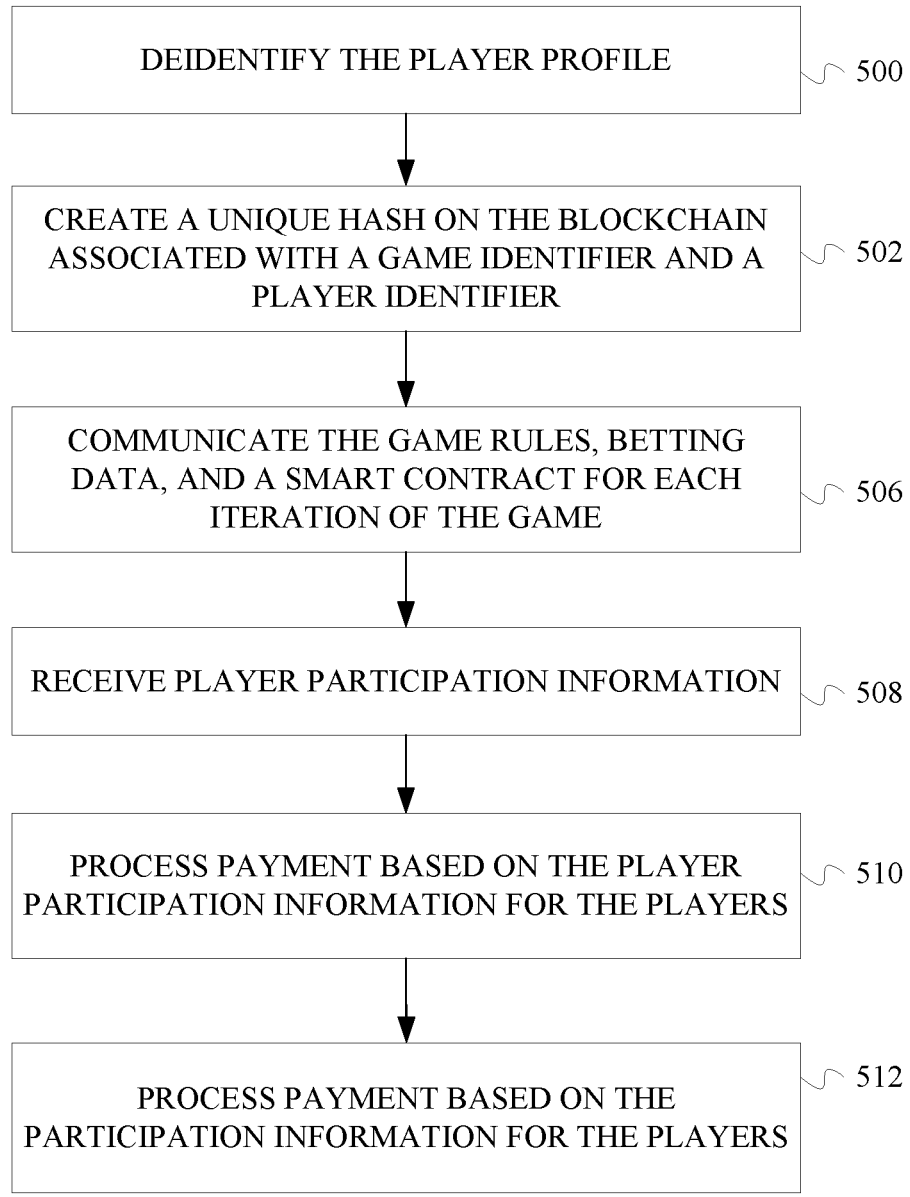
FIG. 5 is a flowchart of a process for establishing a game in accordance with an illustrative embodiment.

FIG. 5 is a flowchart of a process for establishing a game in accordance with an illustrative embodiment. The process may begin by deidentifying the player profile (step 500). In one embodiment, information identifying the user is not shown to other players, participants, and/or hosts before, during, or after the game. For example, platform assigned player identifiers or nicknames may be utilized for players that utilize the platform. A profile creator may ensure that the user is not identifiable through the visible information. In some embodiments, user selected nicknames, numbers, or identifiers may be disallowed to ensure players remain anonymous.

Next, the platform may create a unique hash on the blockchain associated with a game identifier and a player identifier (step 502). The unique hash may be utilized to store applicable player and game information on the blockchain or the associated ledger. The creation of each unique game on the blockchain as a hash of blocks may ensure randomness required to protect and verify fair gameplay. Each aspect of the gameplay is recorded to ensure that gameplay is fair and accurate for all users.

Next, the platform may communicate the game rules, gaming data, and a smart contract for each iteration of the game (step 506). The platform may interact with users through any number of dedicated devices, mobile applications, browsers, computer programs, add-ins, scripts, or instructions. The platform may represent a decentralized platform that may be implemented across areas. In another embodiment, the platform may be specific to geographic locations, potential players, or so forth.

Next, the platform may receive player participation information (step 508). The player participation information may include the number of entries (e.g., squares) selected by the user, number of squares, bet maximum/minimum, supported individuals/groups (e.g., fundraising), timeline, teams, or so forth.

Next, the platform may process payments based on the participation information for the players (step 510). The platform may ensure that all participants have paid into the game before the game may begin. Payments may be automatically implemented in response to a user selection to participate in the applicable game.

As previously disclosed, participation in the game may be utilized to support a fundraising effort for an individual, family, group, organization, business, cause, action, or so forth. For example, a portion of the bet amounts (e.g., 1%, 5%, 10%, 12%, 15% etc.) may be split between the platform host/service provider and a supporting entity. Accurate payments may ensure that the fundraising efforts are successful for the applicable individual, group, or cause. In one example, local businesses or organizations may put up money, gift certificates, goods/services, and/or prizes as an award for winners. Individual players (as charitable contributors) may buy in to support the cause and play an applicable squares game. The results may be tracked with the winner(s) being paid throughout the season. As a result, parents and other parties may support and be involved in the season.

Figure 6:
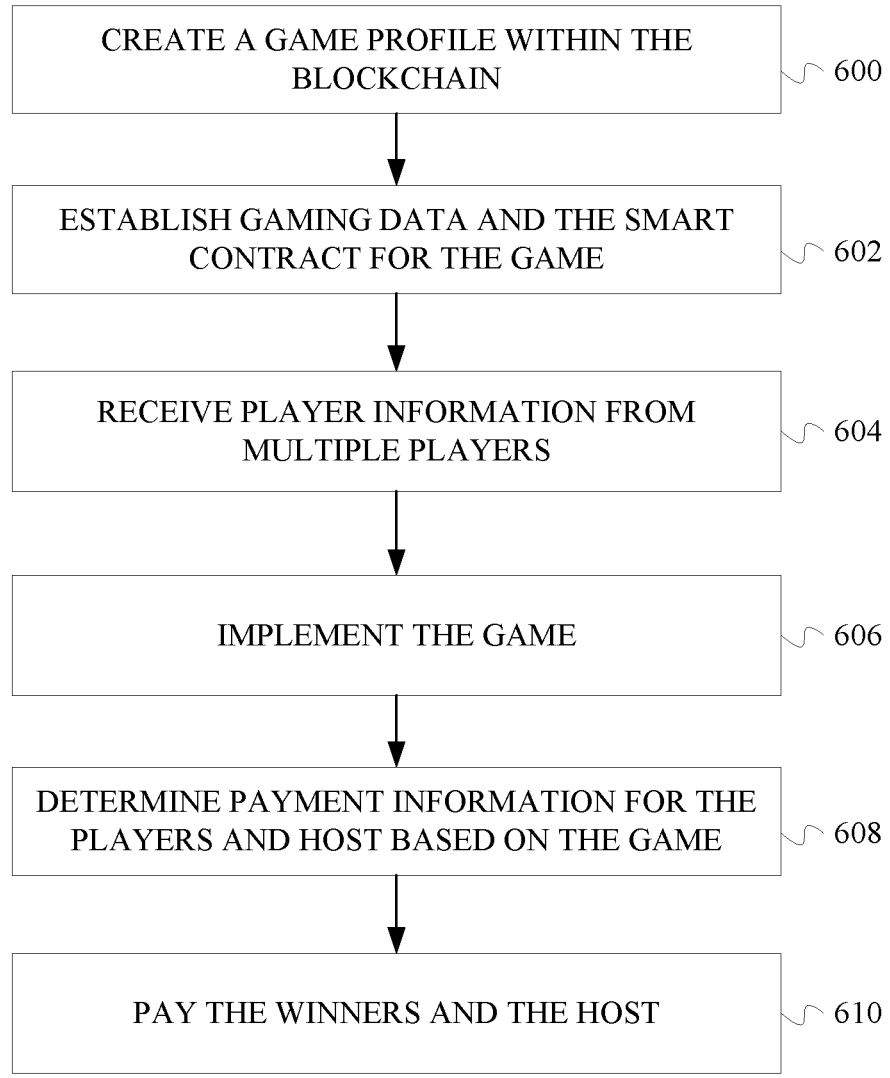
FIG. 6 is a flowchart of a process for implementing a game in accordance with an illustrative embodiment.

FIG. 6 is a flowchart of a process for implementing a game in accordance with an illustrative embodiment. The process may begin by creating a gaming profile within the blockchain (step 600). The gaming profile may be associated with a host, one or more games, type of game, gaming limitations, or so forth. The gaming profile may control how, when, where, and with whom the game is implemented.

Next, the platform may establish gaming data and the smart contract for the game (step 602). The gaming data may be associated with the gaming profile, betting/wagering data, and permissions and settings for betting associated with the game and game implementation.

Next, the platform may receive player information from multiple players (step 604). The player information may include selections made by multiple players associated with the game (where selections are allowed). In some games, the player may only select whether to participate or not and to what financial level the player wants to participate.

Next, the platform may implement the game (step 606). The platform may enable the game to be played, displayed, and communicated to any number of dedicated or player-specific devices. For example, most players may utilize their own smart phone, tablet, personal computer, gaming device, or other electronic device. In another example, dedicated gaming devices may be utilized at a specific location.

Next, the platform may determine payment information for the players and a host based on the game (step 608). The platform may determine the payment information based on the game profile, betting data, player participation information, and other applicable information and data. The payment information may account for any amounts paid to the host, a supporting entity (if applicable), and the applicable players. In one embodiment, the host or service provider that manages the platform may receive a percentage of the betting pool, a flat fee, or other form of compensation.

Next, the platform may pay the winners and the host (step 610). The payments may be implemented utilizing blockchain to provide a more cost-efficient and transparent process. The players may select to cash out or convert their cryptocurrency tokens to hard currency at any time. The players may be compensated based on the gaming data that was established for the game as well as their smart contract and game profile.

Figure 7:
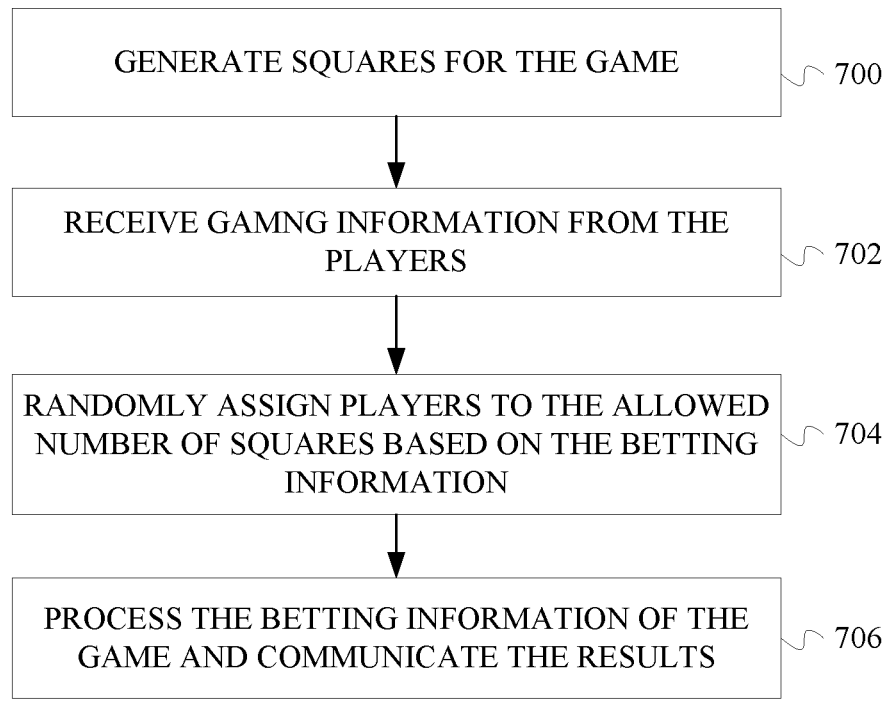
FIG. 7 is a flowchart of a process for implementing a squares game in accordance with an illustrative embodiment.

FIG. 7 is a flowchart of a process for implementing a squares game in accordance with an illustrative embodiment. The process may begin by generating squares for the game (step 700). In one embodiment, the game may represent distribution of 10×10 squares to participating players. The squares may be selected, and payout made based on the score at the first quarter, half, third quarter, final score, and reverse final score.

Next, the platform may receive gaming information from the players (step 702). The gaming information and data may be received based on selections from the associated players and information from their player profiles (e.g., wager/bet amounts, limits, time frame, etc.). The gaming information may be limited or restrained based on limitations, parameters, settings, or other information within the gaming profile. In some embodiments, the players may submit long term gaming information that may be implemented over longer periods (e.g., multiple seasons, years, games, etc.). In one embodiment, the squares on the blockchain may be used to make proposition bets which are wagers on wager ranges or on a far in the future prediction that may not happen in a single game or season. Proposition bets may be placed on any bet or wager range that a player profile may propose. Some examples of future wagers are the winner at the end of a tournament, playoff, season, or a bet on a team for several seasons in the future and may include any verifiable event that is physically verifiable through games conclusions, statistics, or predictions that may be physically or digitally confirmed in the future. An infinite range of predictions may be made and funded by participants setting up accounts and executing specific smart contracts withing the blockchain with participants either selecting a specific prediction range or may be assigned a specific prediction range. Some non-sporting based long-term prediction examples include political outcomes, weather outcomes, awards shows (e.g., Emmys, Oscars, Golden Globes, Man of the Year, etc.), Nobel Prize, singing, talent, reality, game show outcomes, death pools, movie predictions, stock price predictions, factual predictions, and so forth. For example, in one embodiment each square in the larger square or squares within the box/grid may represent a stock, market index, (e.g., Dow Jones, Nasdaq, Dow 30, S&P 500, etc.), index fund, Exchanged Traded Fund, or so forth. The player that selects the correct price or price range at the end of a specific trading period (e.g., daily market close, month, year, etc.) may win.

Next, the platform may randomly assign players to the allowed a number of squares based on the betting information (step 704). Players that have selected to participate may be randomly assigned to squares or groups of random squares based on their selection of the number of squares selected. The players may select from one to the maximum number of squares. In another embodiment, the players may be randomly assigned an order of selection. As a result, the players with the lowest number (i.e., 1, 2, etc.) get to pick their squares first in order. The utilization of random numbers or random selection orders may eliminate the game or house manager and the gaming platform from having any influence over the assignment of the random number generation and assignment of the squares and numbers associated with an event (e.g., game, competition, etc.).

The squares game may be played with two or more players with the available squares. In the past, the best square to have for football has typically been 0|0, a score combination that was found at the end of eight percent of quarters of all games over the past six seasons. A square with 7|0 offered the next best return followed by 0|7, 0|3, and 3|9. The worst boxes/squares to own were those including a 9, 8, or 5.

Next, the platform may process the betting information of the game and communicate the results (step 706). The platform may ensure that all the results of the game are communicated to the applicable players. The platform may also ensure that all applicable winnings, compensation/fees, losses, and other renumeration are paid or transferred to the associated parties.

Figure 8:
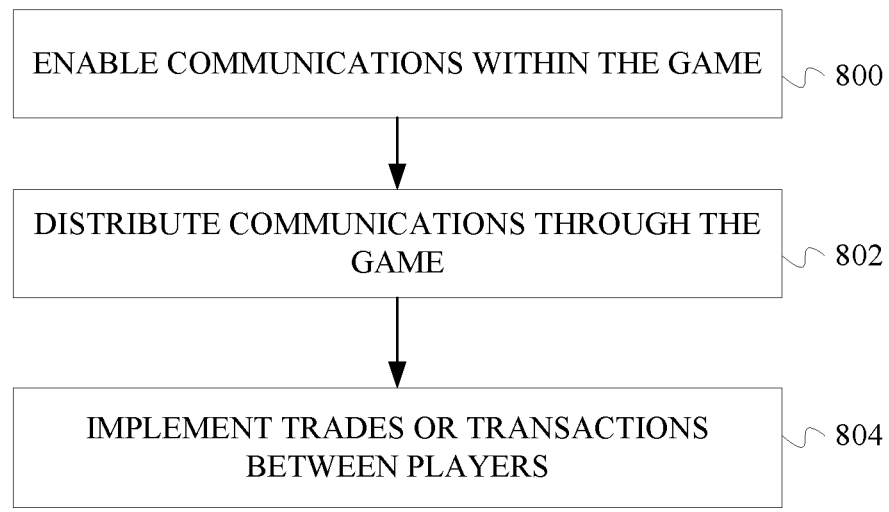
FIG. 8 is a flowchart of a process for enabling actions within the game in accordance with an illustrative embodiment.

FIG. 8 is a flowchart of a process for enabling actions within the game in accordance with an illustrative embodiment. The process may begin by enabling communications within the game (step 800). Communications within the game may be performed according to the gaming profile. Some games may allow communications while others may limit in-game interactions. Communications may be performed through in-application messages associated with the gaming applications that connect to the platform through a number of devices. Communications may be performed via text chat, video/audio chat, video/audio calls, emails, in-application messages, or so forth. Communications may be performed directly, in a group, in a format that is private or public. Communication mediation and monitoring may be performed as needed to protect the integrity of the applicable games and ensure decent and reasonable communications.

Next, the platform may distribute communications through the game (step 802). The platform may encourage friendly banter, encouragement, and competitive discussions. The platform may perform communications filtering or limitations as specified by the applicable gaming profile. For example, limitations regarding explicit or inappropriate language may be implemented. In one embodiment, only pre-approved messages, or communications/messages may be allowed by an administrator. In other embodiments, communications may not be allowed at all. The platform may also be utilized to provide updates, alerts, and notifications. For example, artificial intelligence may be utilized to provide game and statistical data (e.g., percentages, etc.). Information regarding win/loss percentages may be provided in real-time as well as potential hedge information that players may utilize.

Next, the platform may implement trades or transactions between players (step 804). Trades may be performed as allowed by the gaming profile and applicable rules. For example, players may be able to propose sales or trades for different squares/boxes during the game for additional compensation to the selling party. Secondary transactions may also be documented on the blockchain. Desirable or undesirable squares may also be auctioned, sold, or discarded by the player. Trades, sales, auctions, or other transactions may require approval by the applicable players before being added to the smart contract that governs the game. In one example, a user may utilize the various communications options to auction off valuable football squares, such as 7 or 3, in a football squares pool to another player. The communications may also enable secondary propositions or bet hedge capabilities for expanding additional betting.

Figure 9:
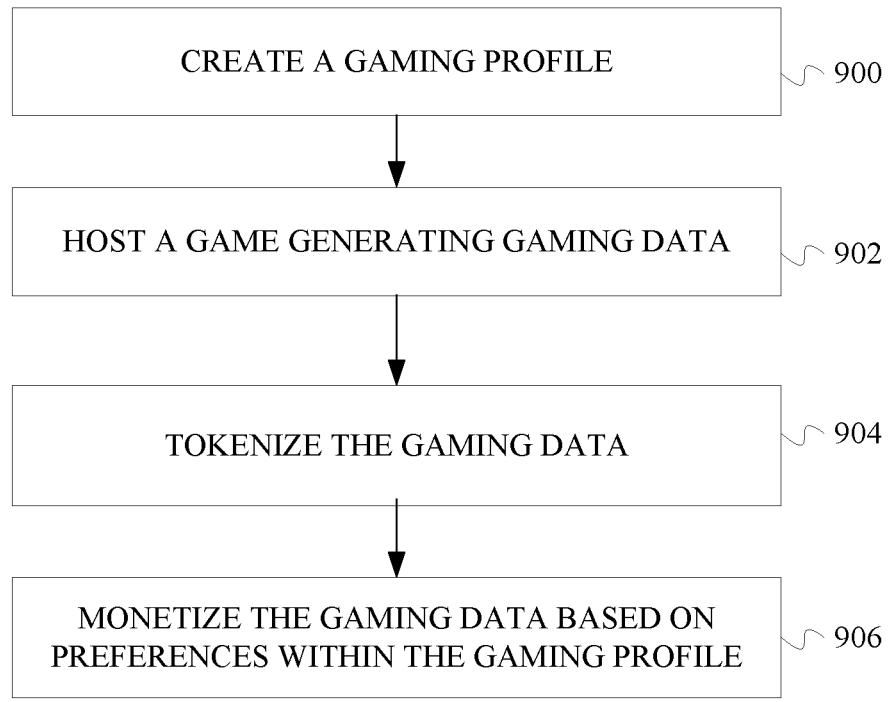
FIG. 9 is a flowchart of a process for monetizing gaming data in accordance with an illustrative embodiment.

FIG. 9 is a flowchart of a process for monetizing gaming data in accordance with an illustrative embodiment. The process may begin by creating a gaming profile (step 900). The gaming profile may be established for a single game, group of games, or collection of games. In one embodiment, the gaming profile may be automatically created based on new games that are required for available players.

Next, the platform may host a game generating gaming data (step 902). The game may be created based on the gaming profile. For example, the gaming profile may specify the total number of squares and players that may be utilized for a squares game and whether results are based on score per quarter/half/period/game, maximum number of squares that may be purchased, number of authorized games, minimum/maximum bet, mid-game sales limitations, and so forth.

Next, the platform may tokenize the gaming data (step 904). The gaming data may be utilized to place the various wagers/bets/selections in a form that is transparently viewed by all the players. As a result, the players may receive assurances that the game is being conducted fairly, equitably, and without any bias or unfair advantage.

Next, the platform may monetize the gaming data based on preferences within the gaming profile (step 906). Any number of bets, wagers, or predictions may be made utilizing cash, cryptocurrency, credits, or so forth. Games may also be implemented to support charity, for bragging rights, or strictly for entertainment. The game may be implemented to comply with applicable laws and standards. For example, some games may be run strictly to support a charitable endeavor, fundraiser, or other event.

In another embodiment, a game may be created to improve customer or brand outreach. For example, players have that have purchased a good or service may enter a game by submitting a product identification (e.g., bar code, serial number, VIN number, serial number, etc.), receipt, or other applicable information. As a result, companies may continue to interact with individuals or groups that buy, support, or otherwise appreciate their products. Top customers or random customers may also be awarded squares as a type of customer or brand outreach.

The process of FIGS. 4-9 may be performed automatically by algorithms, programs, or instructions configured to implement games for any number of players. Any number of preparatory steps may be performed as part of the processes of FIGS. 4-9. For example, a player profile may be created for a user. The player profile may be generated or determined from already available information for the user. For example, the user profile may represent one or more profiles compiled by devices, accounts, services, or so forth. The user may provide answers utilizing one or more surveys, fields, questions, or other applicable information and data to determine applicable information and data.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product presented in any tangible or non-transitory medium of expression having computer usable program code included in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be presented in an electrical, optical, acoustical, or other form of propagated signal (e.g., carrier waves, infrared signals, digital signals, etc.), or wireline, wireless, or other communications mediums.

Computer program code for carrying out operations of the embodiments may be written in any combination of one or more programming languages, including an object-oriented programming language such as Java, Smalltalk, C++, or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 10:
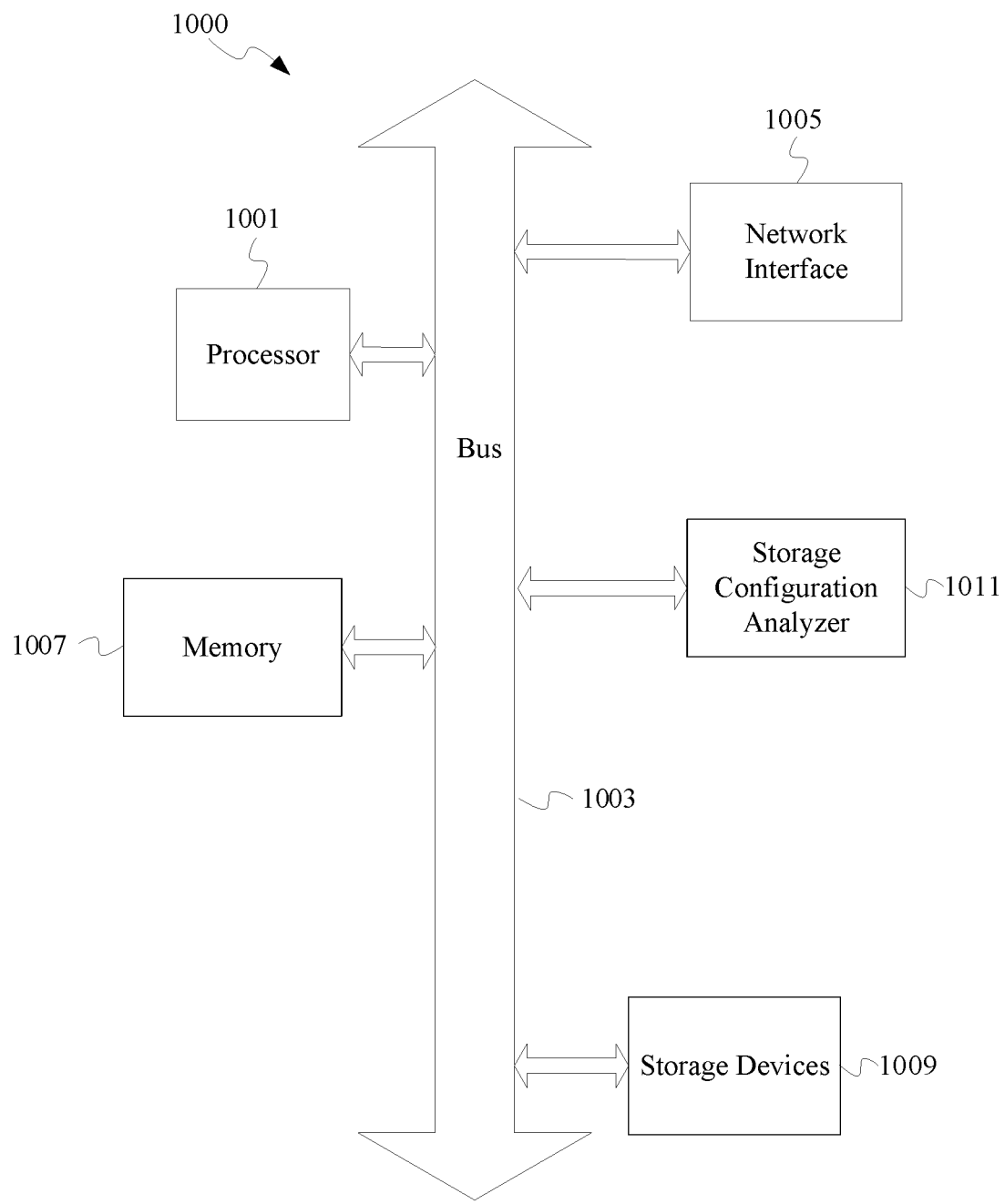
FIG. 10 depicts a computing system in accordance with an illustrative embodiment.

FIG. 10 depicts a computing system 1000 in accordance with an illustrative embodiment. For example, the computing system 1000 may represent a device, such as one or more of the devices 101 of FIG. 1. The computing system 1000 may include a processor unit 1001 (possibly including multiple processors, multiple cores, multiple nodes, and/or implementing multi-threading, etc.). The computing system may include a memory 1007. The memory 1007 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also may include a bus 1003 (e.g., PCI, ISA, PCI-Express, HyperTransport®, InfiniBand®, NuBus, etc.), a network interface 1005 (e.g., an ATM interface, an Ethernet interface, a Frame Relay interface, SONET interface, wireless interface, etc.), and a storage device(s) 1009 (e.g., optical storage, magnetic storage, etc.). The system memory 1007 may include a functionality to implement the aspects described above. The system memory 1007 may include one or more functionalities that store content, blockchain data, parameters, application, user profiles, and so forth. Code may be implemented in any of the other devices of the computing system 1000. Any one of these functionalities may be partially (or entirely) implemented in hardware and/or on the processing unit 1001. For example, the functionality may be implemented with an application specific integrated circuit, in logic implemented in the processing unit 1001, in a co-processor on a peripheral device or card, etc. Further, realizations may include fewer or additional components not illustrated in FIG. 10 (e.g., video cards, audio cards, additional network interfaces, peripheral devices, etc.). The processor unit 1001, the storage device(s) 1009, and the network interface 1005 may be coupled to the bus 1003. Although illustrated as being coupled to the bus 1003, the memory 1007 may be coupled to the processor unit 1001.

The features, steps, and components of the illustrative embodiments may be combined in any number of ways and are not limited specifically to those described. In particular, the illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated those other alternatives or exemplary aspects are considered included in the disclosure. The description is merely examples of embodiments, processes, or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for performing a game utilizing blockchain, comprising:
   creating a player profile in response to information received from a player;
   receiving gaming information including at least a wagered amount from the player associated at least a squares game through a user interface of a gaming device associated with the squares game;
   automatically assigning selections to the player for the one or more games utilizing the player profile and the gaming information, wherein the selections are communicated to the user at least visually through the user interface, wherein the player is assigned the selections including the one or more squares that are associated with a score of an event associated with the squares game;
   storing the player profile, the gaming information, and the selection in a gaming platform associated with the squares game, at least the selections and the gaming information are stored utilizing blockchain to ensure fairness of the squares game; and
   compensating one or more winners of the squares game and a host associated with each of the squares game once completed, wherein one or more winners are determined based on a score of an event associated with the squares game for a time period and the selections of the player, wherein the player profile, the gaming information, the selections, and the winners are documented utilizing the blockchain in the gaming platform.

2. The method of claim 1, further comprising:
   enabling participation in the at least squares games in response to completing the player profile.

3. The method of claim 1, further comprising:
   deidentifying publicly available information in the player profile protecting the privacy of the player.

4. The method of claim 1, further comprising:
   creating a unique hash on the blockchain associated with a game identifier for the squares game and the player.

5. The method of claim 1, further comprising:
   receiving currency from the player for squares game;
   converting the currency into cryptocurrency compatible with the squares game; and
   communicating the game rules, betting data, and a smart contract for each of the squares game.

6. The method of claim 1, wherein the gaming platform implements transactions between two or more of a plurality of players of the squares game in response to terms agreed upon by the two or more plurality of players.

7. The method of claim 1, wherein the squares game is enabled to be played with 1) one or more squares randomly assigned to the player, and 2) an order of selecting the one or more squares are randomly assigned to a plurality of players including the player.

8. The method of claim 1, wherein each of a plurality of squares of the squares game is associated with a statistic for an event associated with the squares game, and wherein the winners are determined based on the one or more players including the player that have one or more of the squares associated with the statistic.

9. The method of claim 1, wherein winners of the squares game are paid in the cryptocurrency.

10. The method of claim 1, further comprising:
    enabling communications between a plurality of players playing the squares game; and
    distributing communications through the squares game as received from the plurality of players.

11. The method of claim 1, further comprising:
    implementing transactions between two or more of a plurality of players of the one or more games in response to terms agreed upon by the two or more plurality of players.

12. The method of claim 1, further comprising:
    generating advertisements to display within the squares game based on the player profile.

13. A system for implementing one or more squares game via blockchain, comprising:
    a plurality of electronic devices executing a gaming application, the gaming application is configured to receive player information through a user interface, and gaming information associated with a player and the one or more squares games and communicate gaming information associated with one or more squares games through the user interface; and
    a gaming platform accessible by the plurality of electronic devices executing the gaming application through one or more networks, wherein the gaming platform creates a player profile in response to the player information received from the player, automatically assigns selections to the player associated with an event for the one or more squares games utilizing the player profile and the gaming information including at least a wagered amount, storing at least the selections and the gaming information in a ledger associated with the gaming platform utilizing blockchain, communicates the selections to the player through the user interface, and compensates one or more winners of the one or more squares games and a host associated with each of the one or more squares games once the event is completed, wherein the one or more winners of the one or more squares games are determined based on a score of an event associated with the one or more games for a time period compared with the selections of the player, and wherein the gaming platform stores the player profile, the gaming information, and the selection in blockchain.

14. The system of claim 13, wherein the gaming information includes the wagered amount from the player for the one or more squares games, wherein the player is assigned one or more squares that are associated with a score of the event associated with the one or more squares games.

15. The system of claim 13, wherein the gaming platform receives currency from the player for one or more games, converts the currency into cryptocurrency compatible with the one or more squares games, and creates a unique hash on the blockchain associated with a game identifier for the one or more games and the player, and wherein winners of the one or more games are paid in the cryptocurrency.

16. The system of claim 13, wherein the gaming platform implements transactions between two or more of a plurality of players of the one or more games in response to terms agreed upon by the two or more plurality of players.

17. The system of claim 13, wherein betting performed through the gaming platform is implemented utilizing smart contracts.

18. A gaming platform, comprising:
a processor for executing a set of instructions;
a memory for storing the set of instructions, wherein the set of instructions are executed to:
create a player profile in response to information received from a player;
receive betting information including at least a wagered amount from the player associated with the one or more games through a user interface;
automatically assign selections to the player for the one or more games utilizing the player profile and the betting information, wherein the selections are communicated to the player through the user interface;
store the selections and the betting information in a digital ledger associated with the gaming platform utilizing blockchain; and
compensate one or more winners of the one or more games and a host associated with each of the one or more games once completed, wherein the one or more winners are determined based on a score of an event associated with the one or more games for a time period and the selections of the player.

19. The gaming platform off claim 18, wherein bets of a plurality of players including the player are implemented utilizing blockchain smart contracts.

20. The gaming platform of claim 18, wherein the set of instructions are further executed to:
receive currency from the player for the one or more games;
convert the currency into cryptocurrency compatible with the one or more games, wherein winners of the one or more games are compensated utilizing the cryptocurrency.

* * * * *